Patented Sept. 16, 1947

2,427,594

UNITED STATES PATENT OFFICE 2,427,594

IRISH MOSS FOOD PRODUCT

Alexander Frieden, New Rochelle, and Sanford Joseph Werbin, New York, N. Y., assignors to Stein Hall & Co. Inc., New York, N. Y., a corporation of New York No Drawing. Application February 1, 1943,
Serial No. 474,324

5 Claims. (Cl. 99—131)

The present invention relates generally to food products and has particular reference to a food product having improved gelling or thickening properties. Coordinately, the invention relates to a new material intended to be added to certain food products to impart such improved properties to them.

The primary object of the invention is to provide a means for improving the gelling or thickening properties of substantially calcium-free food products such as cake icings, glazes, pie fillings, fruit juices, fruit mixes, and the like.

Another objective of the present invention is to provide a new material which may be employed generally as a substitute for agar-agar (not only for food products but possibly for other purposes as well), and for pectin.

When agar-agar is prepared with water in concentrations even as low as 1%, and then cooked and subsequently cooled, it sets back to a stiff gel. Because of this characteristic, agar-agar has heretofore been used as an instrumentality for thickening and otherwise improving the gelling qualities of various food products such as pie fillings and the like.

It has long been known that another (and currently more available) seaweed product, namely, Irish moss, has similar gelling and thickening properties. However, Irish moss must be used in considerably larger quantities. For example, up to a concentration of approximately 2%, no setting effect at all is manifested. In concentrations above 3½% however, a gel can be produced comparable to that which would be effected by concentrations of agar-agar up to approximately 1%.

Generally speaking, it is undesirable, especially in food products, to introduce an extraneous gelling or thickening ingredient such as Irish moss, in the relatively high concentrations which are required to enable the Irish moss to exercise its gelling function to best advantage. Moreover, when Irish moss is used in concentrations above 3½%, the product gets undesirably thick during the heating that is required to dissolve the Irish moss, and there is danger of burning or otherwise injuring the product.

Our present invention is predicated upon the discovery that the gelling and thickening properties of Irish moss can be greatly enhanced, and can be caused to manifest themselves in much smaller concentrations of Irish moss, by modifying the Irish moss with certain potassium or ammonium salts. Our experiments have led us to believe that these salts react in some way with the Irish moss to produce a new product having enhanced setting properties. This product may or may not be a true compound, but it is in any case a "complex," probably of colloidal character, and will be referred to herein as an Irish moss-salt complex.

This complex, when used with substantially calcium-free food compositions or other similar materials in concentrations as low as ½% of the fluid ingredients, imparts quick-setting improved gelling qualities to the resultant product, producing a reasonably stiff gel when cooled. In somewhat higher concentrations, such as 1% or 1½%, these desirable qualities are greatly enhanced, and a gelling effect may be produced which is in every respect comparable to that which has heretofore been brought about by the use of agar-agar. It is noteworthy that a product treated with the present complex has thin-boiling and relatively heavy cold-setting properties, producing a gel which is thicker and firmer than that which would be produced by the use of the same amount of Irish moss alone.

The potassium and ammonium salts which produce this desirable result are the true salts of inorganic or simple organic acids such as the chlorides, the iodides, the sulphates, the phosphates, the carbonates, the citrates, the lactates, the acetates, and the tartrates. The potassium salts are most effective, the ammonium salts somewhat less so. The sodium salts, we have found, are quite ineffective to produce the desired result.

Inasmuch as any appreciable quantity of calcium ions have a tendency to precipitate Irish moss, and would destroy its effect as an ingredient of the present complex, the present invention is limited in its applicability to food products or other compositions which are substantially calcium-free.

Perhaps the simplest and most practical method of employing the present invention lies in mixing Irish moss and the selected potassium or ammonium salt, in dry state, and introducing this mixture directly into the food mix or other product whose gelling or thickening properties are to be enhanced. Generally speaking, the amount of salt may vary from approximately one-tenth to approximately three times the amount of Irish moss. Where the concentration of the mixture in the ultimate product is relatively low, i. e., between approximately ½% and 2% of the aqueous portion, the proportion of salt to moss may be in the higher ranges. Where the concentration of the mixture in the product is relatively higher, assuming that it may be desirable under certain circumstances to use such higher concentrations, the proportion of salt to moss must be kept within the lower ranges.

From a practical standpoint, we have found it preferable that the concentration of the mixture or complex should be no less than approximately ¼% of the aqueous phase of the product in which it is used, and the amount of salt itself should be no less than approximately 0.1% thereof. Similarly, the amount of Irish moss, per se, should be no less than approximately 0.15% of the aqueous phase of the product.

Example I 50 parts of a dry potassium salt, such as potassium chloride, potassium iodide, potassium sulphate, or potassium phosphate, are mixed with 50 parts of the dry hot-water-soluble fraction of Irish moss. Approximately 1½ parts of the resultant mixture are introduced into approximately 100 parts of the aqueous portion of a fruit pie filling or similar product which is to be treated; and the product is then heated until all ingredients have been dissolved, and then allowed to cool. It sets back fairly rapidly to a reasonable stiff jelly.

Example II

Approximately 25 parts of dry hot-water-soluble fraction of Irish moss are mixed with 75 parts of ammonium chloride or ammonium sulphate. From 1 to 2 parts of the resultant mixture are then introduced into 100 parts of the aqueous portion of a fruit preserve whose gelling or thickening properties are to be enhanced; and the product is then heated to an adequate amount (which may be for example from 70° C. to 85° C. or even higher) to bring about complete solution or swelling of the added ingredients, and then allowed to cool. The product sets back to a fairly stiff gel.

Example III

To 200 parts of the aqueous portion of a cake icing or similar product are added 1 part of a mixture of the dry ingredients referred to in Examples I and II, this mixture consisting of approximately 20 parts of the selected salt and 80 parts of the Irish moss. Upon heating and subsequent cooling, a highly desirable thickening is produced.

Example IV

A fruit jelly may be produced by boiling together 100 parts of grape juice, 100 parts of sugar, about 1.12 parts of refined Irish moss, about 0.16 part of potassium chloride, and about 0.32 part of sodium acetate. This mixture, when allowed to cool, forms a firm workable jelly very similar in nature to that which is ordinarily produced by the use of pectin. The present complex has the advantage that, unlike pectin, it is not critically affected either by sugar concentration or pH value. The sodium acetate is employed as a mild alkaline buffer, and in general, where the acid content of the fruits or fruit juices is high, it is usually advisable to add to the Irish moss-salt complex a mild buffer of this kind, such as sodium acetate, sodium sulphate, di-basic sodium phosphate, sodium bicarbonate, sodium citrate, or the like.

In each of the foregoing examples, any of the selected true salts of potassium or ammonia may generally be used, either singly or in combination. The nearly neutral or slightly alkaline salts have been found to be the most effective ones.

The Irish moss ingredient is preferably a refined hot-water-soluble extract of the raw moss, since it is with this fraction of the raw moss that the salts have been found to react most vigorously. The domestic grades of Irish moss have been found, in general, to be superior to the imported grades.

It may under certain circumstances be desirable to prepare the Irish moss-salt complex in advance, and to introduce the resultant pure complex into the product whose gelling or thickening properties are to be improved. There are various ways of carrying out this objective, among which may be mentioned (a) a formation of the complex by alcohol precipitation and (b) a formation of the complex by salt precipitation.

(a) One example of the alcohol precipitation method of producing the Irish moss-salt complex consists in first forming an aqueous solution containing 2% of dry hot-water-soluble extract of Irish moss and of a suitable salt such as potassium chloride, then heating the solution at approximately 85° C. until the moss and the salt are completely dissolved. The solution is then allowed to cool to approximately 60° C., and it is then run into a sufficient quantity of 95% alcohol until the complex is precipitated. Further washing with alcohol, or with an alcohol-water solution, may be desirable to remove some of the chloride taste from the precipitated complex. The precipitate is then dried at fairly low temperatures, such as approximately 40° C. This dried complex may then be stored or packed, in readiness for ultimate use as a material to be added to a food product or other composition whose gelling or thickening properties are to be improved thereby.

In case it is desired to start with crude Irish moss, an aqueous solution of moss and salt is first made, and after heating to approximately 85° C., possibly higher, the solution is filtered to remove insoluble impurities. Then, while still warm, it is run into an alcohol solution until the desired precipitation of the complex is effected. After such washing as may be deemed necessary, the precipitate is dried at approximately 40° C., or at any other temperature sufficiently low to prevent destruction of the gum body.

During the process of carrying out this alcohol precipitation, it has been found that the concentration of alcohol, at the completion of the precipitation procedure, is usually around 60%.

(b) As an example of the method of forming the desired Irish moss-salt complex by a salt precipitation method, a 3% Irish moss solution is first heated at approximately 85° C. until the moss has been dissolved as far as possible. If crude moss has been used, it is advisable at this point to filter off any insoluble impurities. While still hot, approximately 150 parts of this solution are then mixed with approximately 100 parts of a cold water 10% salt solution, employing any of the potassium or ammonia salts hereinbefore mentioned. The great excess of the salt, as compared with the Irish moss, will result in separating the desired Irish moss-salt complex. After this complex is cooled, it can be washed several times by decantation with cold tap water, then filtered and dried; or it may be washed directly on the filter with cold water. The resultant dried complex is then ready for use, as may be desired, in food products or other products whose gelling or thickening properties are to be enhanced.

Regardless of how the Irish moss-salt complex is produced, whether as a preliminary preparation or as an integral part of the ultimate product, the gelling and thickening characteristics are far greater than those of an equivalent quantity of Irish moss alone. The setting properties of the product are markedly increased, and the cold resultant gel readily regains its fluidity upon reheating. The complex has been found to function best at hydrogen-ion concentrations between pH 4 and pH 10.

Generally speaking, except for the minimum amounts hereinbefore referred to, the proportions of the salt and Irish moss ingredients of the complex may be widely varied, depending upon the salt employed, upon the purity of the Irish moss that is used, upon the ultimate product with which the complex is to be used, and upon the concentrations of the complex in such product. Where less than ¼% of the complex is used in the product to be thickened or gelled, the effect is so inappreciable as to be almost valueless. Similarly, while concentrations up to about 4% may safely be used, these higher concentrations are usually not desirable because of the high viscosity developed during the heating period, with consequent danger of burning or otherwise impairing the product. For most purposes, a food product whose aqueous phase contains approximately between 1% and 2% Irish moss-salt complex utilizes the invention to maximum advantage.

For these reasons, it will be understood that the specific examples herein set forth for the purpose of explaining the general nature of our invention are merely illustrative in character, and that, within the general scope herein indicated, changes in the details may be made by those skilled in the art without departing from the spirit and scope of the invention as expressed in the appended claims.

Having thus described our invention, what we claim as new and desire to secure by Letters Patent is:

1. A food product having its gelling properties improved by the addition thereto of a relatively small quantity of a complex consisting of Irish moss and a salt chosen from the group which consists of the edible potassium and ammonium salts.

2. A food product as set forth in claim 1, the Irish moss ingredient of said complex consisting essentially of the hot-water-soluble fraction of the raw moss.

3. A food product as set forth in claim 1, the salt constituting no less than approximately 0.1% and the Irish moss no less than approximately 0.15% of the aqueous portion of said product.

4. A material for improving the gelling or thickening properties of a food product, consisting of a complex of Irish moss and a salt chosen from the group which consists of the edible potassium and ammonium salts.

5. A material as set forth in claim 4, the Irish moss ingredient consisting essentially of the hot-water-soluble fraction of the raw moss.

ALEXANDER FRIEDEN.
SANFORD JOSEPH WERBIN.

REFERENCES CITED

The following references are of record in the file of this patent:

UNITED STATES PATENTS

| Number | Name | Date |
| --- | --- | --- |
| 113,562 | Rand | Apr. 11, 1871 |
| 128,248 | Rand | June 25, 1872 |
| 341,072 | Stanford | May 4, 1886 |
| 742,124 | Martin | Oct. 20, 1903 |
| 1,778,688 | Reynard | Oct. 14, 1936 |
| 1,814,986 | Walsh | July 14, 1931 |
| 1,946,679 | Thomas | Feb. 13, 1934 |
| 2,000,807 | Wig | May 7, 1935 |
| 2,011,594 | Seltzer | Aug. 20, 1935 |
| 2,060,336 | Near | Nov. 10, 1936 |
| 2,097,230 | Lucas | Oct. 26, 1937 |
| 2,337,562 | Lund | Dec. 28, 1943 |

FOREIGN PATENTS

| Number | Country | Date |
| --- | --- | --- |
| 22,069 | Great Britain | 1903 |

OTHER REFERENCES

Kertesz, "The Effect of Calcium on Plant Tissue," The Canner, vol. 88, No. 7, page 26, 1938.